US010419642B2

(12) United States Patent
Morovic et al.

(10) Patent No.: US 10,419,642 B2
(45) Date of Patent: Sep. 17, 2019

(54) COLORANT CALIBRATION

(71) Applicant: Hewlett-Packard Development Company, L.P., Houston, TX (US)

(72) Inventors: Jan Morovic, London (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/073,405

(22) PCT Filed: Apr. 21, 2016

(86) PCT No.: PCT/US2016/028656
§ 371 (c)(1),
(2) Date: Jul. 27, 2018

(87) PCT Pub. No.: WO2017/184150
PCT Pub. Date: Oct. 26, 2017

(65) Prior Publication Data
US 2019/0089867 A1 Mar. 21, 2019

(51) Int. Cl.
*H04N 1/50* (2006.01)
*H04N 1/00* (2006.01)
(Continued)

(52) U.S. Cl.
CPC ............. *H04N 1/50* (2013.01); *G06K 15/027* (2013.01); *G06K 15/1878* (2013.01);
(Continued)

(58) Field of Classification Search
CPC ........... H04N 1/00015; H04N 1/00023; H04N 1/00034; H04N 1/00068; H04N 1/00082;
(Continued)

(56) References Cited

U.S. PATENT DOCUMENTS 7,551,315 B2 6/2009 Hoshii et al.
7,645,015 B2 * 1/2010 McConica ............. B41J 29/393 347/19
(Continued)

FOREIGN PATENT DOCUMENTS

CN 1644383 7/2005
CN 104956653 9/2015
(Continued)

OTHER PUBLICATIONS

Zeng, H. et al., Inter-printer Color Calibration Using Constrained Printer Gamut, Jan. 17, 2005. Available at: http://proceedings.spiedigitallibrary.org/proceeding.aspx?articleid=857795.

*Primary Examiner* — Scott A Rogers
(74) *Attorney, Agent, or Firm* — Tarolli Sundheim Covell & Tummino LLP

(57) ABSTRACT

A system includes a memory to store pre-computed boundary look-up tables (LUTs) for respective drop weight boundary classes of a printer having a plurality of colorants. Each pre-computed boundary LUT provides one Neugebauer Primary area coverage (NPac) for each node of the LUT in response to a device color input value that corresponds to each node. Measurement data stored in the memory represent measured drop weight values for the plurality of different colorants of the printer. A processor executes instructions that interpolate among the pre-computed LUTs based on the measured drop weight values to determine a proportional weighting of each of the pre-computed LUTs.

15 Claims, 5 Drawing Sheets

(51) Int. Cl.
*G06K 15/02* (2006.01)
*H04N 1/60* (2006.01)
*H04N 1/54* (2006.01)

(52) U.S. Cl.
CPC ..... *H04N 1/00015* (2013.01); *H04N 1/00023* (2013.01); *H04N 1/00034* (2013.01); *H04N 1/00045* (2013.01); *H04N 1/00068* (2013.01); *H04N 1/00087* (2013.01); *H04N 1/60* (2013.01); *H04N 1/605* (2013.01); *H04N 1/6033* (2013.01); *G06K 2215/0094* (2013.01); *H04N 1/54* (2013.01)

(58) Field of Classification Search
CPC ........ H04N 1/00087; H04N 1/50; H04N 1/56; H04N 1/60–6097; G06K 15/027; G06K 15/1878; G06K 2215/0094
See application file for complete search history.

(56) References Cited

U.S. PATENT DOCUMENTS 8,873,104 B2 10/2014 Nachlieli et al.
9,020,371 B2 4/2015 Amit et al.
9,501,727 B2 * 11/2016 Morovic .............. H04N 1/6025
9,756,221 B2 * 9/2017 Morovic .............. H04N 1/6025
10,003,719 B2 * 6/2018 Morovic .............. H04N 1/6016
2005/0083540 A1 * 4/2005 Hersch ................. H04N 1/6025 358/1.9
2008/0100658 A1 * 5/2008 Bastani .................. B41J 29/393 347/16
2013/0101328 A1 4/2013 Morovic et al.
2014/0016143 A1 1/2014 Morovic et al.
2016/0052318 A1 2/2016 Humet Pous et al.
2016/0086059 A1 * 3/2016 Morovic ................ B41J 2/2146 347/19
2018/0007237 A1 * 1/2018 Morovic .................. H04N 1/52
2019/0037109 A1 * 1/2019 Morovic ........... H04N 1/00023
2019/0042165 A1 * 2/2019 Morovic ............... G06F 3/1206

FOREIGN PATENT DOCUMENTS

CN 108163945 12/2015
JP 2004306465 11/2004
JP 2005178026 7/2005
WO WO-2015094206 6/2016

* cited by examiner

COLORANT CALIBRATION

BACKGROUND

Color printing may result from a number of colorants of different colors being superimposed on top of a substrate, such as paper or other media. Since many printing technologies only allow for a very small number of levels of inks to be deposited at a given location on a substrate, half-toning may be used to obtain ink patterns that result in a given color when seen from a suitable viewing distance. These halftone patterns also result in colorants being deposited on top of or next to one another in a specific manner, providing a color that relates nonlinearly to the amounts of the colorants (e.g., inks) used. Color control for the respective colorants may be increased due to Neugebauer's model of halftone color reproduction. In one example, Neugebauer's model provides that the color of a halftone pattern is the convex combination of the colors of the Neugebauer primaries (NPs) used in the pattern. Thus, an NP is one of the possible ink overprints, with its convex weight being the relative area covered by it.

DETAILED DESCRIPTION

This disclosure provides in at least one example colorant calibration in a printing system utilizing interpolated look-up tables (LUTs).

As one example, a calibration method employs a set of pre-computed boundary LUTs that are computed for respective colorant boundary classes and mapping RGB values to corresponding Neugebauer Primary Area Coverage (NPac) values. Each of the pre-computed LUTs can be a combination of MIN/MAX drop-volume LUTs based on a predetermined set of conditions (e.g., parameter specifying max 20% drop weight change), with the 'MAX' in each given colorant class being a nominal/default value, for example, where nominal specifies the best case or maximum amount of ink that can be dispensed from a new printer. The calibration method calculates a new calibrated LUT by interpolating among the pre-computed LUTs a measured drop weight change (e.g., such as those provided by closed-loop color (CLC) system), to compensate for the measured changes with respect to the pre-computed boundary LUTs. By utilizing drop weight to NPac mappings between the pre-computed LUTs and the calibrated LUT, conventional measurements for calibrating a Halftone Area Neugebauer Separation (HANS) system can be reduced since fewer data points are utilized to perform the mappings versus extensive calibration measurements of a conventional calibration for the HANS system.

A cause of color variation in a printing system is often due to the variation of drop weight that relates to the amount of colorant dispensed from a given print nozzle in a printer. Thus, for the same number of drops applied in the system, smaller drops may result in lighter, less chromatic colors while larger drops may yield darker, more chromatic results. Color-calibrating a printing system can thus include compensating for colorant drop weight changes that result from printing system usage and/or due to environmental conditions. Current calibration procedures often involve numerous and costly measurements to calibrate more advanced printing systems such as a Halftone Area Neugebauer Separation (HANS) system. As disclosed herein, systems and methods are provided to efficiently perform color calibration for a printing system.

Figure 1:
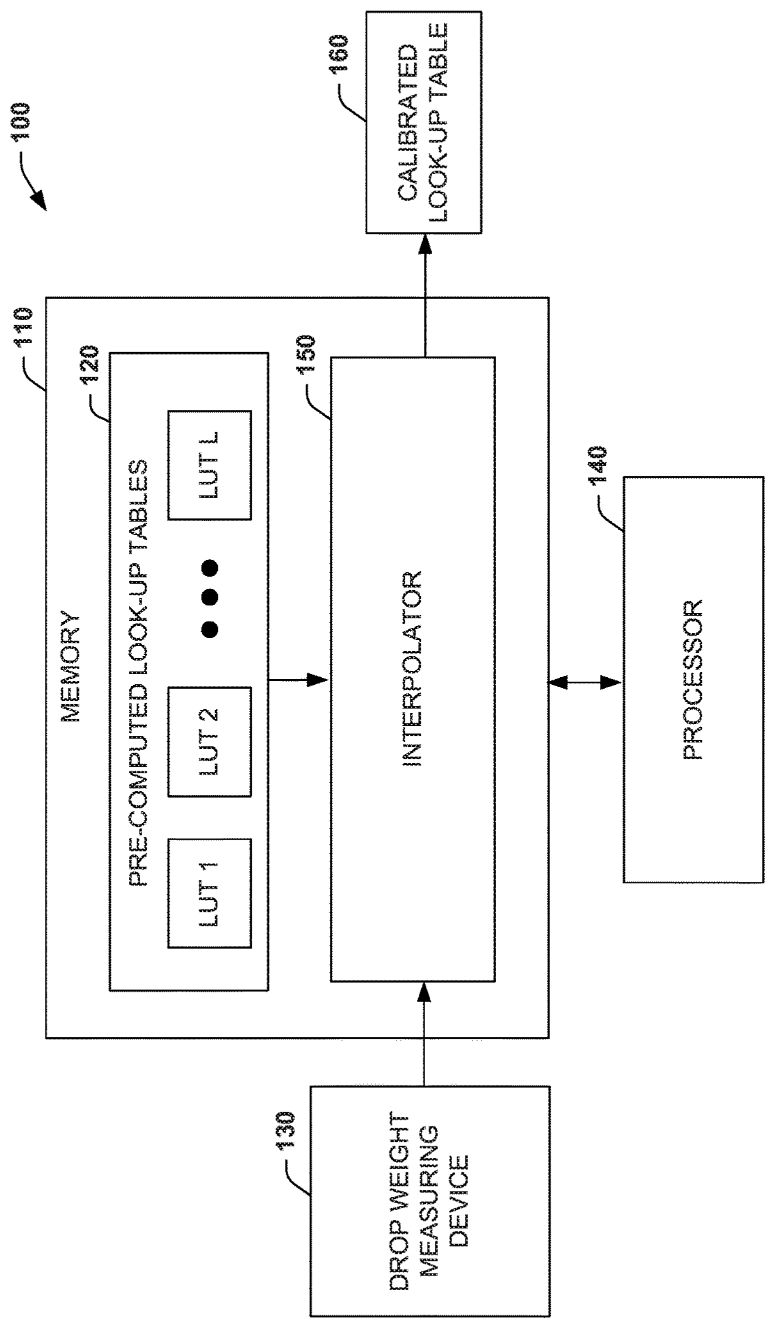
FIG. 1 illustrates an example of a system to generate a calibrated look-up table.

FIG. 1 illustrates an example of a system 100 that generates a calibrated LUT to provide efficient color calibration of a printer. The system 100 includes a memory 110 to store pre-computed boundary LUTs for respective drop weight boundary classes of a printing system having a plurality of different colorants (e.g., inks, glues, synthetics, toners, waxes, dyes, each having substantially any color or color combination and so forth). Each pre-computed boundary LUT 120, shown as LUT 1 though LUT L with L being a positive integer, provides one corresponding NPac for each node of the LUT in response to a device color input value that indexes to each node. Each LUT 120 can be indexed via Device Color (DC) values (e.g., RGB) and contains one NPac per node. For example, in a regular, 3^3 LUT, there are 27 nodes in the LUT, each corresponding to DC ranges such as RGB values that can have all combinations of [e.g., 0%, 50%, 100%] value and where at each of the 27 nodes of that LUT there is one corresponding NPac.

A measuring device 130 measures drop weight values for the plurality of different colorants of the printing system. The measuring device 130 (e.g., can be internal or external to the printer) can include using a closed-loop color system (not shown) that includes a color sensor (or sensors) to detect reflected optical energy from primary color tiles that are illuminated with a narrow-band light source. In one example, this operates in a similar manner as a classical densitometer. In some cases, the printer (or external system) generates a target pattern on a substrate and the measuring device 130 scans the printed pattern to determine the drop weights. This can include utilizing print and measuring ramps of the individual inks to infer the drop weight of each ink, for example.

A processor 140 executes instructions from the memory 110. The processor 140 can be a central processing unit (CPU), field programmable gate array (FPGA), or a set of logic blocks that can be defined via a hardware description language such as VHDL. The instructions can be executed out of firmware, random access memory, and/or executed as configured logic blocks, such as via registers and state machines configured in a programmable gate array.

Figure 2:
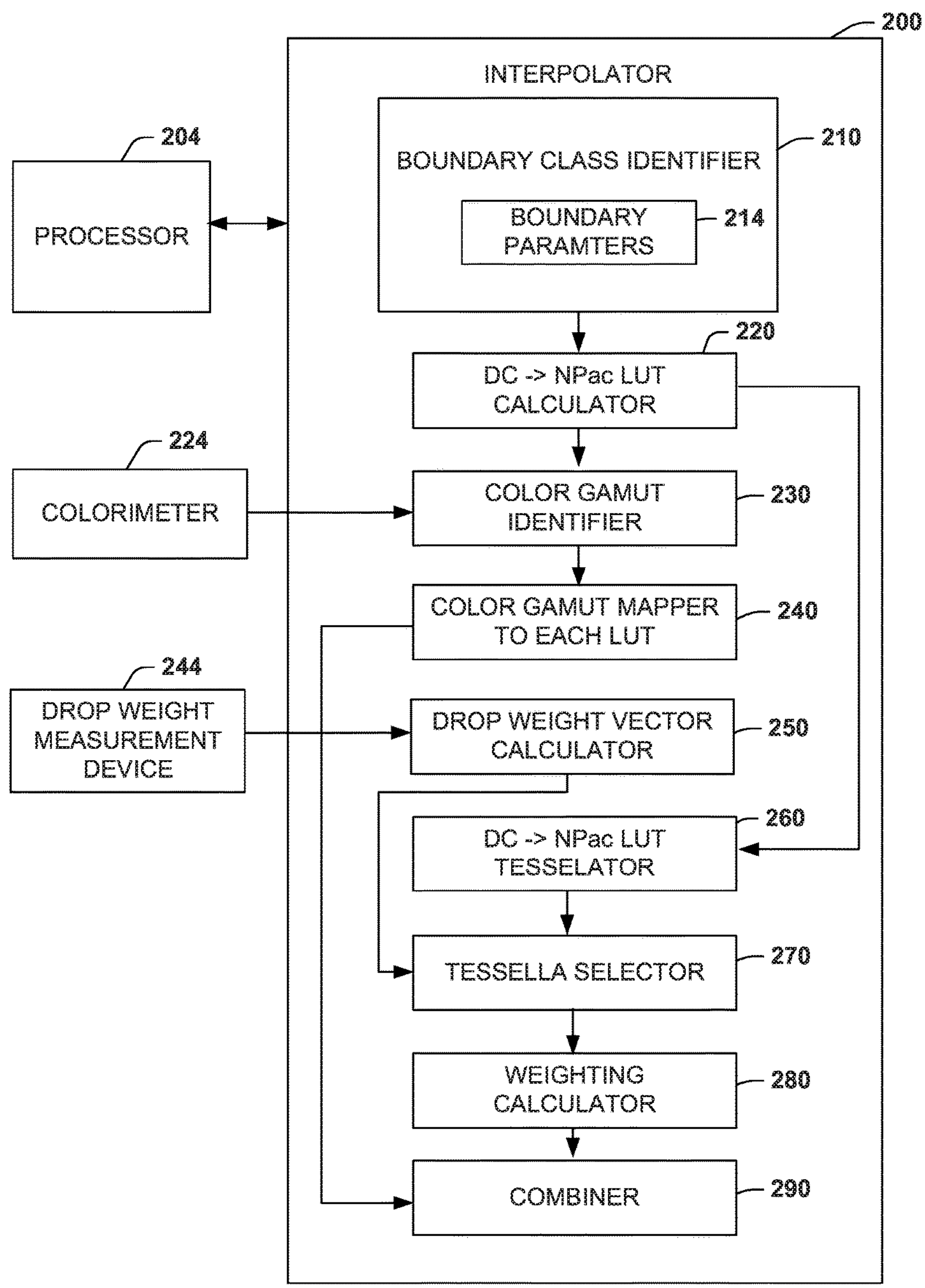
FIG. 2 illustrates an example of an interpolator that is employed in a color calibration system to generate a calibrated look-up table.
Figure 3:
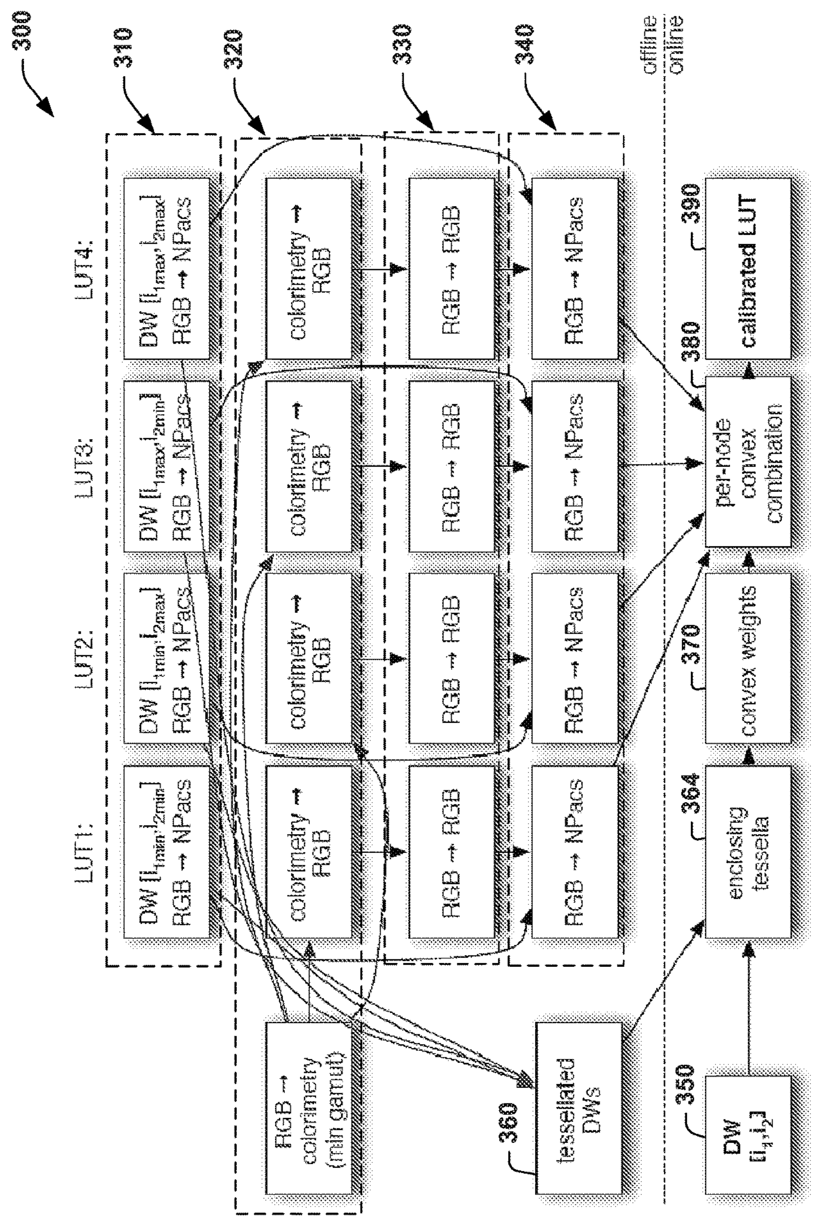
FIG. 3 illustrates an example of an interpolator process flow for the interpolator illustrated in FIG. 2.

The instructions include an interpolator 150 to interpolate among the pre-computed LUTs 120 based on the measured drop weight values from the measuring device 130 to determine a proportional weighting of each of the pre-computed LUTs. The interpolator 150 applies the proportional weighting to each of the pre-computed LUTs 120 to generate a calibrated look-up table (LUT) 160. The calibrated LUT 160 provides a respective NPac in response to the device color input value to control dispensing of the plurality of different colorants (e.g., inks) by the printing system (see e.g., FIG. 4). For instance, the proportional weighting for each of the LUTs 160 can be applied to a corresponding node in each of the LUTs to provide a corresponding calibrated LUT node value in response to the device color input value (e.g., RGB value) and the measured drop weight values. FIGS. 2 and 3 provide examples of how the pre-computed LUTs 120 are processed via the interpolator 150 with respect to drop weight values from the measuring device 130 to generate the calibrated LUT 160 which can then be employed by a controller to adjust colorant dispersal of the printing system.

In some examples, the system 100 can be employed to calibrate a HANS pipeline of a printing system. The HANS pipeline may be executed by the processor 140, or in other implementations, by a printer controller of the printing system. In one implementation, the NPacs employed by the HANS pipeline utilize a set of equations referred to as Neugebauer equations. Neugebauer equations are tools for characterizing color printing systems based upon halftoning techniques. The Neugebauer equations are associated with colors referred to as the Neugebauer Primaries, which in a binary (bi-level) printing device, are the $2^n$ combination of n colorants (e.g., inks) and their overprints, wherein the application of each of the n colorants is at either 0% or 100%. Generally, the number of Neugebauer Primaries (NPs) is $k^n$, where k is the number of levels at which an ink can be used and n is the number of colorants. For example, for a printer utilizing six different inks where 0, 1, or 2 drops of each ink may be specified at each halftone pixel, results in $3^6$ or 729 NPs.

A key challenge in color calibration for conventional systems is the need for a number of measurements that increases with the number of colorants used in a page-wide printing system. The systems and methods described herein provide calibration based on measurements/estimates of only N input quantities—the drop weights of the N colorants (or their decrease percentages versus the nominal drop weight). This may reduce the number of calibration measurements to be performed via conventional calibration processes in an HANS pipeline. For instance, existing calibration systems either rely on the presence of ink channels to which drop weight changes can be directly applied, or, in the HANS pipeline example, on measuring color changes across the device color space (e.g., RGB) requiring numerous and costly measurements.

FIG. 2 illustrates an example of an interpolator 200 that is employed in a color calibration system to generate a calibrated look-up table to provide efficient color calibration of a printer. The interpolator 200 of FIG. 2 can be executed by a processor 204 as previously described. The interpolator 200 includes a boundary class identifier 210 to identify N drop weight ranges associated with $2^N$ classes, N being a positive integer, across which calibration for a respective printer is to be enabled. At the maximum end of calibration, drop weights of new print heads is considered and at the minimum end those of aged print heads are considered where a choice of what level of drop weight reduction to accept is to be made. For example, boundary parameters 214 can specify the top end of these ranges (DWmax), corresponding to new print heads (e.g., measured as a nominal value in the lab), and the bottom end (DWmin) that of print heads that have (e.g., 20%) smaller drops than the new print heads as specified by the boundary parameters.

The ranges identified by the boundary class identifier 214 results in $2^N$ per-ink-drop-weight classes/combinations that establish the boundaries to constrain the calibration that is to be performed. A device color (DC) to NPAC LUT calculator 220 of FIG. 2 computes DC (e.g., RGB) to NPac LUTs for each of the $2^N$ classes identified by the boundary class identifier 210. Output from the calculator 220 can include $2^N$ vertices of a hypercube formed by the $2^N$ combinations of min and max drop weights determined at 210/220. Here, either a LUT optimization can be used or LUTs can be constructed based on heuristics, with the difference being that each condition can build NPacs for LUT nodes on the assumption of different drop weights. The end results are $2^N$ DC to NPac LUTs.

A colorimeter 224 provides color measurements that are taken for each of the LUT's nodes from the LUTs identified via the $2^N$ classes of colorant combinations. The colorimeter 224 measures the absorbance of particular wavelengths of light by a specific printed pattern (e.g., combination of colorants). A color gamut identifier 230 identifies the LUT from the respective classes based on the color measurements from 224, such as by selecting LUT having the smallest color gamut (e.g., typically the LUT corresponding to all inks being at minimum drop size).

A color gamut mapper 240 prefixes each LUT with a DC to DC (e.g., RGB to RGB) mapping obtained by taking the colorimetries of each LUT processed at 230. The color gamut mapper 240 of FIG. 2 then interpolates the mapping through the color measurements (e.g., colorimetry-DC data) of all the other LUTs. This results in each of the $2^N$ LUTs addressing the same color gamut and each node of each LUT mapping to the same corresponding color, but using potentially different NPacs in each case, where those NPacs are such that under the conditions of each of the LUTs they result in the same (or similar) per-node color when printed.

A drop weight measurement device 244 provides measured drop weight values (e.g., drop weight measurement data) for each the printer's N colorants. For example, the drop weight measurement device 244 can employ a closed-loop color measurement process, such as where a color sensor detects reflected energy from primary color tiles that are illuminated with a narrow-bond light source. The measurement device 244 can operate in much the same way as a classical densitometer. In some cases, the printer generates a target pattern and a measurement system (e.g., implemented in the printer or an external measurement system) optically scans the pattern to determine the drop weights. This can include utilizing print and measuring ramps of the individual colorants to infer respective drop weight values for each colorant. From the measured drop weights at 244, a drop weight vector calculator 250 determines a drop weight (DW) vector.

As shown in FIG. 2, a DC to NPac tesselator 260 tessellates the $2^N$ vertices of the hypercube formed by the $2^N$ combinations of min and max drop weights determined at 210/220. For example, the tesselator 260 provides a collection of polytopes (e.g., polygons in two dimensions, polyhedra in three dimensions) that fill the convex hull of the color gamut with no overlaps or gaps. In one example, the tesselator 260 is programmed to perform the tesselation using the Delaunay tessellation technique. In other implementations, other tessellation techniques may be used. Since the NPs can be combined convexly and relate to colorimetry in a linear color space, the tessellation technique may be any geometric tessellation technique. A tessella selector 270 determines a V-vertex tessella that contains the DW vector from 250.

A weighting calculator 280 determines convex weights (e.g., 0.1, 0.2, 0.3, and so forth). For example, the weighting calculator 280 assigns a weight to respective portions of the selected tessella. A combiner 290 then performs a per node convex combination of the weights. In convex geometry, a convex combination (e.g., performed by combiner 290) is a linear combination of points (which can be vectors, scalars, or more generally points in an affine space) where all coefficients are non-negative and sum to 1. More formally, given a finite number of points $x_1, x_2, \ldots, x_n$ in a real vector space, the convex combination of these points is a point of the form $\alpha_1 x_1+\alpha_2 x_2+\ldots+\alpha_n x_n$, where the real numbers $\alpha_i$ satisfy $\alpha_i \geq 0$ and $\alpha_1+\alpha_2+\ldots+\alpha_n=1$.

The calibrated LUT can be provided by the interpolator 200 as a calibrated DC to NPac LUT by convexly combining the LUTs corresponding to the V vertices of the simplex formed by the tesselator 260, where the convex weights are the V barycentric coordinates obtained from the volumes of simplices formed by the DW vector and the V−1 vertex combinations taken from the V vertices from 360 and 364. As used herein, the barycentric coordinate system provides a coordinate system in which the location of a point of a simplex (e.g., a triangle, tetrahedron, and so forth) is specified as the center of mass, or barycenter, of usually unequal masses placed at its vertices. Coordinates of the barycentric coordinate system can also extend outside the simplex, where one or more coordinates become negative.

FIG. 3 illustrates an example of an interpolator process flow 300 of an interpolator, such as the interpolator 200 illustrated in FIG. 2. The process flow 300 depicted in FIG. 3 shows a specific example where 4 colorants (e.g., inks) are analyzed, which results in 16 combinations of each ink being either at minimum or maximum drop weight. In this example, 4 LUTS shown as LUT 1 though LUT 4 are constructed, where boundary classes over minimum and maximum drop weights are identified and RGB to NPacs LUTs are constructed for each LUT at 310. In the example, RGB notation is specified as a specific example of device color (DC) notation. The gamut identification is shown at 320 of FIG. 3, which corresponds to the color gamut identifier 230 of FIG. 2. At 330, a color gamut mapping is performed that prefixes each LUT with a DC to DC (e.g., RGB to RGB) mapping by processing the colorimetries taken for each LUT at 320. At 340, RGB to NPacs LUTs are created with each LUT addressing the same color gamut and each node of each LUT mapping to the same corresponding color. From measured drop weights at 350, a drop weight (DW) vector is determined shown as [i1, i2].

For a 2-ink example, one of two tessellated triangles computed at 360 can be selected as a single enclosing tessella at 364. As a further example, a convex weighting (e.g., implemented by weighting calculator 280) can be performed at 370 followed by a per node combining (e.g., by combiner 290) at 380 to generate a calibrated LUT 390. The calibrated LUT 390 can be sent to a printer controller (See e.g., FIG. 4) which utilizes the LUT to control the desired amount of colorants as calibrated that are dispersed on a given substrate.

Figure 4:
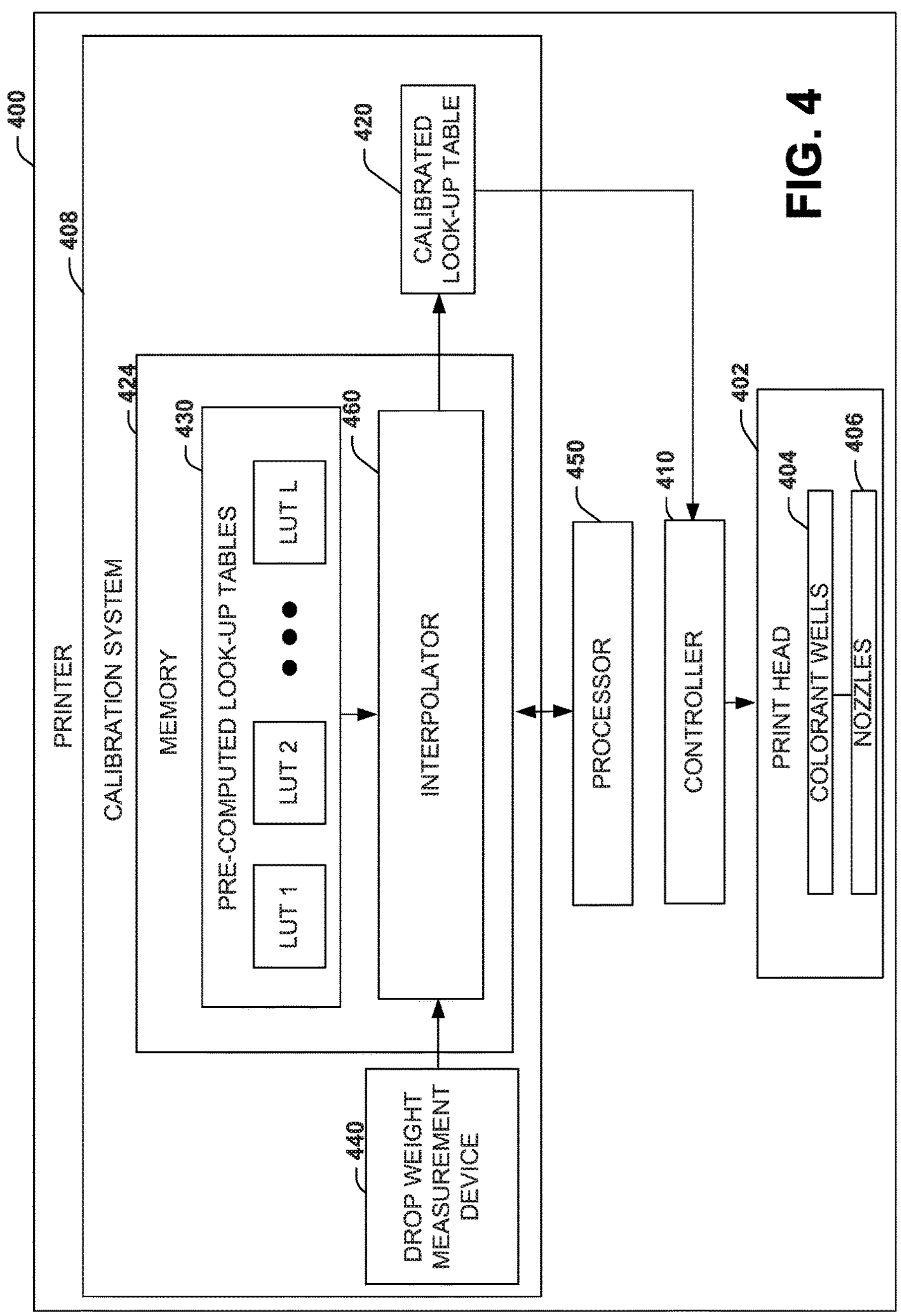
FIG. 4 illustrates an example of a printer that employs a calibrated look-up table.

FIG. 4 illustrates an example of a printer 400 that employs a calibrated look-up table to provide efficient color calibration of the printer. The printer 400 includes a print head 402 having a plurality of wells 404 (e.g., ink wells or channels) to disperse colorants on a substrate (e.g., paper, plastic, and so forth) via a plurality of nozzles 406. The printer 400 includes a controller 410 to issue drop weight commands to the print head 402 to control the amount and pattern of colorant dispersed on the substrate. A calibration system 418 provides a calibrated look-up table (LUT) 420 to the controller 410 to adjust the amount of colorant dispersed on the substrate.

The calibration system 418 a memory 424 to store pre-computed boundary look-up tables (LUTs) 430 for respective drop weight boundary classes of the printer 400 having a plurality of different colorants. Each pre-computed boundary LUT 430 provides one NPac for each node of the LUT in response to a device color (DC) input value that corresponds to each node. A measuring device 440 (internal or external to the printer) measures drop weight values for the plurality of different colorants of the printer 400. A processor 450 executes instructions from the memory 424. The instructions (or hardware logic as previously described) include an interpolator 460 to interpolate among the pre-computed LUTs based on the measured drop weight values to determine a proportional weighting of each of the pre-computed LUTs 430. The interpolator 460 applies the proportional weighting to each of the pre-computed LUTs to generate the calibrated LUT 420. The calibrated LUT 420 provides a respective NPac in response to the device color input value to control dispensing of the plurality of different colorants via the controller 410 and the print head 402. Although not shown in the example printer 400 of FIG. 4, the interpolator 460 can also include each of the interpolator functions depicted in FIGS. 2 and 3.

Figure 5:
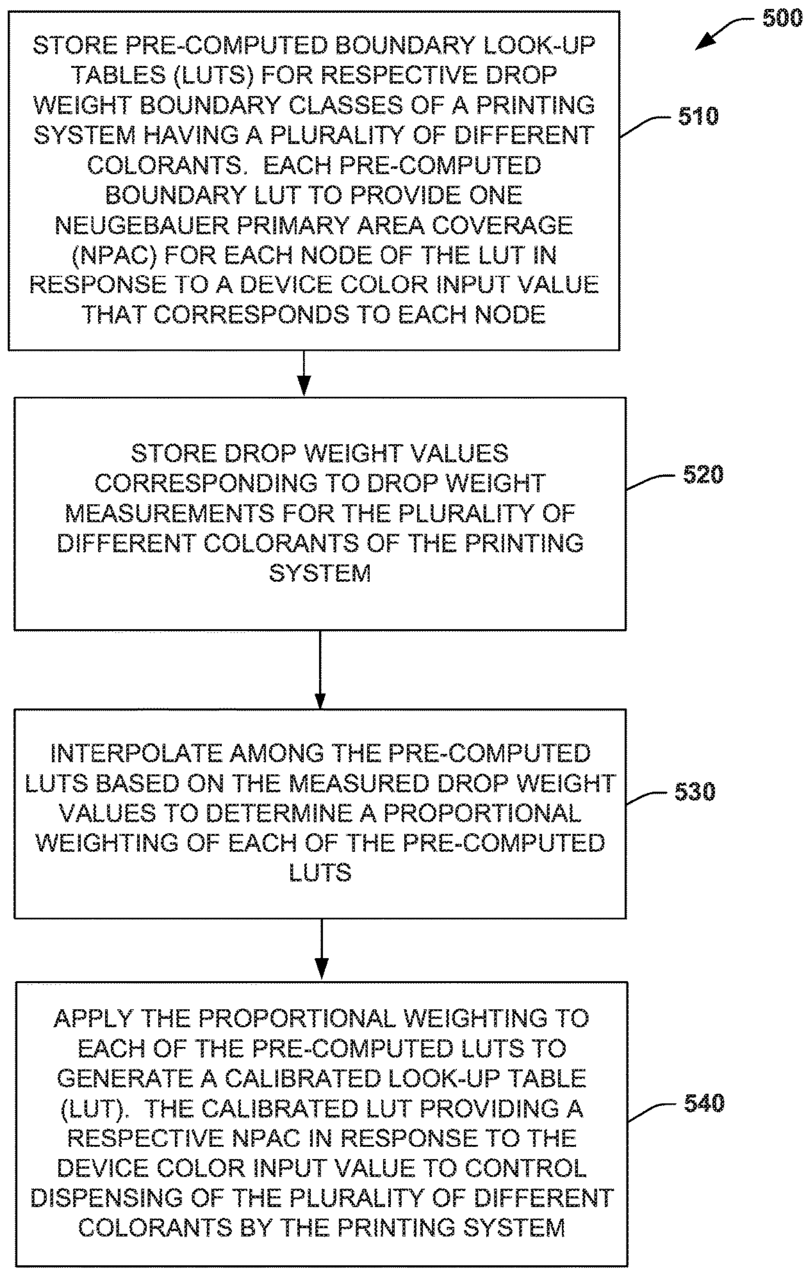
FIG. 5 illustrates an example of a method to generate a calibrated look-up table.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be implemented by instructions executed by various hardware components such as by one or more processors, an integrated circuit, computer, or a controller, for example.

FIG. 5 illustrates an example of a method 500 that generates a calibrated look-up table to provide efficient color calibration of a printer. At 510, the method 500 includes storing pre-computed boundary LUTs (e.g., LUTs 120 of FIG. 1)) for respective drop weight boundary classes of a printing system having a plurality of different colorants. Each pre-computed boundary LUT provides an NPac value for each node of the LUT in response to a device color input value (e.g., an RGB or other color value) that corresponds to each node. At 520, the method 500 includes measuring drop weight values for the plurality of different colorants of the printing system (e.g., via measuring device 130, 244, or 440). At 530, the method 500 includes interpolating among the pre-computed LUTs based on the measured drop weight values to determine a proportional weighting of each of the pre-computed LUTs (e.g., via interpolator 150, 200 or 460). At 540, the method 500 includes applying the proportional weighting to each of the pre-computed LUTs to generate a calibrated look-up table (LUT) (e.g., via weight calculator 280). The calibrated LUT provides a respective NPac in response to the device color input value to control dispensing of the plurality of different colorants by the printing system. Although not shown, the method 500 can also include of the interpolator functions (e.g., 210 though 290)) disclosed with respect to FIGS. 2 and 3 such as prefixing each LUT from the respective boundary classes with a device color (DC) to DC mapping based on color measurements for each LUT.

What have been described above are examples. It is, of course, not possible to describe every conceivable combination of components or methods, but one of ordinary skill in the art will recognize that many further combinations and permutations are possible. Accordingly, this disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system, comprising:

a memory to store pre-computed boundary look-up tables (LUTs) for respective drop weight boundary classes of a printer including a plurality of different colorants, each pre-computed boundary LUT to provide one Neugebauer Primary area coverage (NPac) for each node of the LUT in response to a device color input value that corresponds to each node;

measurement data stored in the memory to represent measured drop weight values for the plurality of different colorants of the printer;

a processor to execute instructions stored in the memory, the instructions to:

interpolate among the pre-computed LUTs based on the measured drop weight values to determine a proportional weighting of each of the pre-computed LUTs;

apply the proportional weighting to each of the pre-computed LUTs; and generate a calibrated look-up table (LUT), the calibrated LUT providing a respective NPac in response to the device color input value to control dispensing of the plurality of different colorants by the printer.

2. The system of claim 1, the instructions further to identify N drop weight ranges associated with $2^N$ classes, N being a positive integer, across which calibration for the printer is to be enabled, wherein boundary parameters specify a top end of the drop weight ranges and a bottom end of the drop weight ranges.

3. The system of claim 2, the instructions further to compute DC to NPac LUTs for each of the $2^N$ classes identified by the boundary class identifier.

4. The system of claim 3, the instructions further to identify the LUT from the respective classes with a smallest color gamut.

5. The system of claim 4, the instructions further to prefix each LUT from the respective classes with a device color (DC) to DC mapping based on color measurements for each LUT.

6. The system of claim 5, the instructions further to interpolate the DC to DC mapping through the color measurements of the respective LUTs, where each of the respective LUTs address the same color gamut and each node of each LUT maps to the same corresponding color.

7. The system of claim 6, the instructions further to:

tessellate $2^N$ vertices of a hypercube formed by $2^N$ combinations of minimum and maximum drop weights; and select a V-vertex tessella from the vertices of the hypercube.

8. The system of claim 7, the instructions further to assign a weight to each of the respective portions of the selected V-vertex tessella representing proportions of colorant to be applied.

9. The system of claim 8, wherein the weight assigned to the each of the respective portions of the selected V-vertex tessella comprise V barycentric coordinates obtained from volumes of simplices formed from a drop weight vector and respective V−1 vertex combinations from the selected V-vertex tessella.

10. The system of claim 8, the instructions further to perform a per node convex combination of the weights from the respective portions of the selected V-vertex tessella to generate the calibrated LUT.

11. A printer, comprising:

a print head including a plurality of wells to disperse a plurality of different colorants on a substrate;

a controller to issue drop weight commands to the print head to control an amount of each colorant dispersed on the substrate; and a calibration system to provide a calibrated look-up table (LUT) to the controller to specify the amount of each colorant dispersed on the substrate, the calibration system comprising:

a memory to store pre-computed boundary look-up tables (LUTs) for respective drop weight boundary classes of a printing system having a plurality of different colorants, each pre-computed boundary LUT to provide a Neugebauer Primary area coverage (NPac) for each node of the LUT in response to a device color input value that corresponds to each node;

measurement data stored in the memory that represents measured drop weight values for the plurality of different colorants of the printer;

a processor to execute instructions from the memory, the instructions to:

interpolate among the pre-computed LUTs based on the measured drop weight values to determine a proportional weighting of each of the pre-computed LUTs, apply the proportional weighting to each of the pre-computed LUTs; and generate the calibrated LUT, the calibrated LUT providing a respective NPac in response to the device color input value, the controller providing the commands to the print head to control dispensing of the plurality of different colorants according to the respective NPac.

12. The printer of claim 11, the instructions further to identify the LUT from the respective classes with a smallest color gamut.

13. The system of claim 12, the instructions further to prefix each LUT from the respective classes with a device color (DC) to DC mapping based on color measurements of each LUT.

14. A method, comprising:

storing pre-computed boundary look-up tables (LUTs), in a memory, for respective drop weight boundary classes of a printing system having a plurality of different colorants, each pre-computed boundary LUT to provide one Neugebauer Primary area coverage (NPac) for each node of the LUT in response to a device color input value that corresponds to each node;

storing drop weight values, via a processor, corresponding to drop weight measurements for the plurality of different colorants of the printing system;

interpolating among the pre-computed LUTs, via the processor, based on the drop weight values to determine a proportional weighting of each of the pre-computed LUTs; and applying the proportional weighting to each of the pre-computed LUTs, via the processor, to generate a calibrated look-up table (LUT), the calibrated LUT providing a respective NPac in response to the device color input value to control dispensing of the plurality of different colorants by the printing system.

15. The method of claim 14, further comprising prefixing each LUT from the respective boundary classes with a device color (DC) to DC mapping based on color measurements for each LUT.

* * * * *